United States Patent [19]
Suzuki

[11] 3,800,498
[45] Apr. 2, 1974

[54] SLEEVE FILM CUTTING DEVICE

[76] Inventor: Mitsugu Suzuki, 11-106, Yabe-Danchi/321, Yabe-cho, Totsuka-ku, Yokohama-shi, Japan

[22] Filed: June 8, 1972

[21] Appl. No.: 260,797

[30] Foreign Application Priority Data
June 17, 1971 Japan.......................... 46-51834[U]

[52] U.S. Cl......................... 53/77, 53/182, 83/62.1, 83/355, 83/543, 83/593
[51] Int. Cl............................................. B26d 7/24
[58] Field of Search.......... 53/180, 182, 77; 83/424, 83/62, 62.1, 350, 355, 356.2, 543, 579, 593

[56] References Cited
UNITED STATES PATENTS
| 3,473,288 | 10/1969 | Nakamura et al. | 53/182 X |
| 2,575,417 | 11/1951 | Heyman | 83/350 |
| 3,626,797 | 12/1971 | Calvert et al. | 83/62 |
| 3,650,089 | 3/1972 | Miller et al. | 53/180 |
| 3,503,175 | 3/1970 | Marasso et al. | 53/182 X |

Primary Examiner—Granville Y. Custer, Jr.
Assistant Examiner—James F. Coan
Attorney, Agent, or Firm—C. E. Tripp

[57] ABSTRACT

This application discloses a horizontal form, fill and seal machine provided with a conveyor for moving two or more groups of prepackaged articles, at equally spaced intervals, to a forming device that shapes film from a roll into a sleeve or tube surrounding the groups of spaced articles. After the articles are encapsulated in the tube, a cutting device, located adjacent the conveying paths of the articles and which is operated in synchronism with the conveyor, severs the web tube between the groups of articles while the articles are in motion. Thereafter the groups of articles, each of which are within their individual sleeve, are conveyed to a heat tunnel in order to shrink the sleeve crowding the articles together.

1 Claim, 8 Drawing Figures

PATENTED APR 2 1974  3,800,498
SHEET 1 OF 3
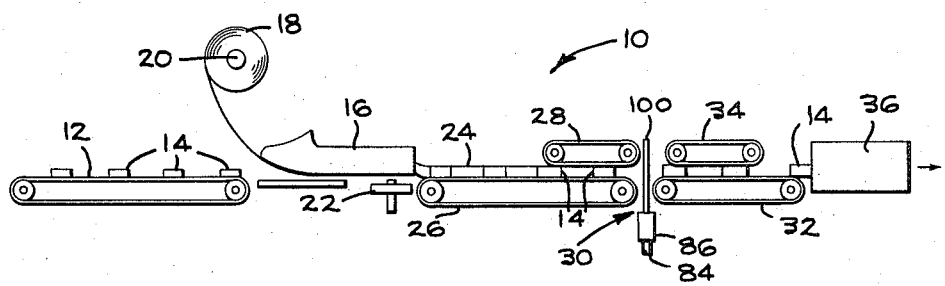
FIG_1
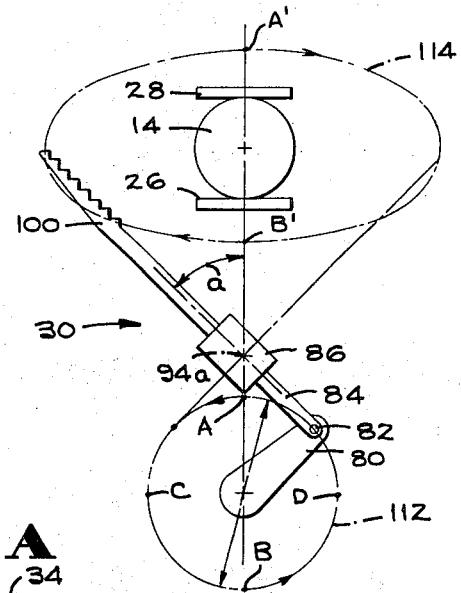
FIG_4
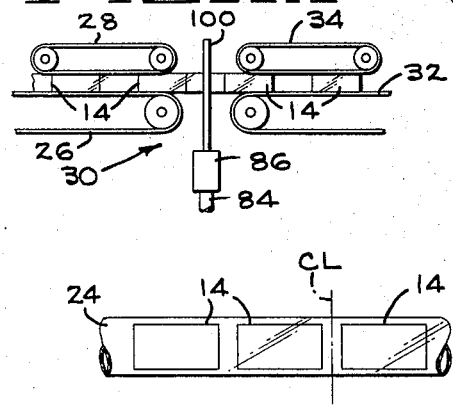
FIG_1A
FIG_5
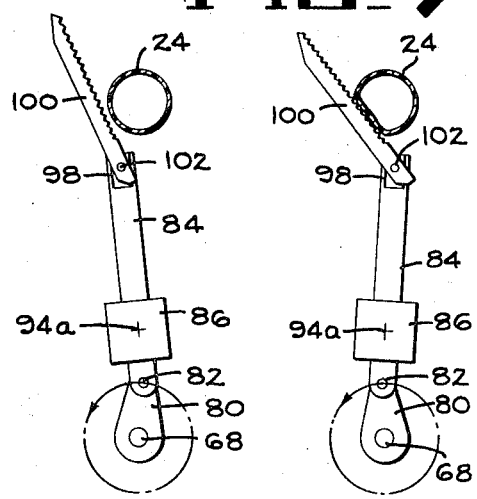
FIG_7
FIG_6

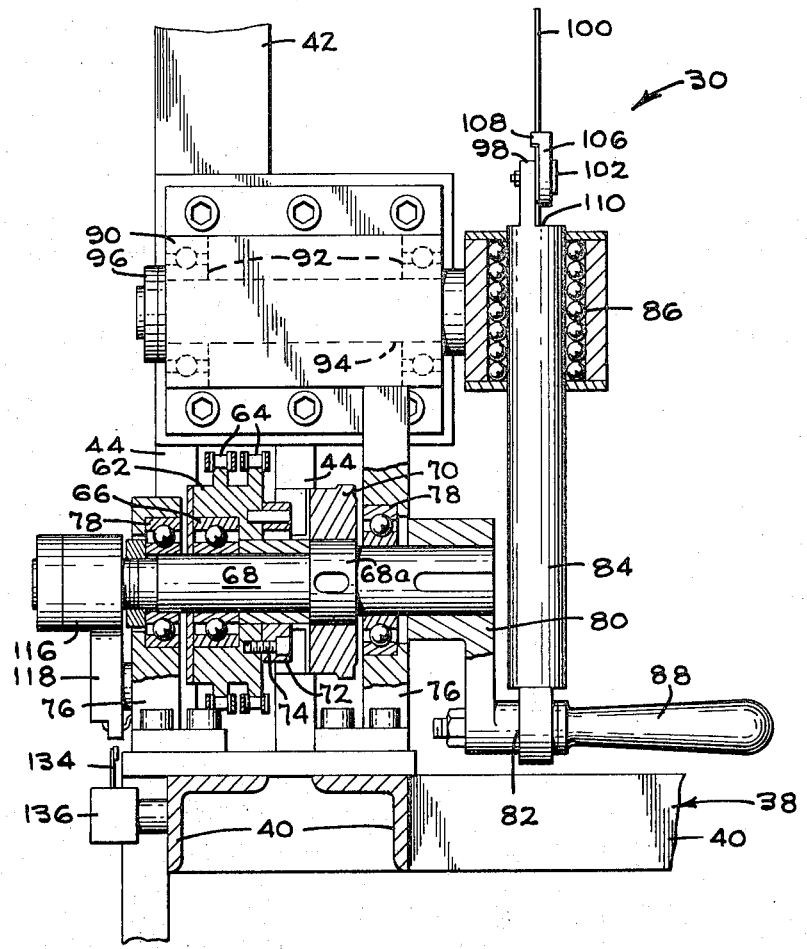

ns
3,800,498

SLEEVE FILM CUTTING DEVICE

BACKGROUND OF THE INVENTION

Promotion and sale of many items, notably food products, in multi-packs such as bottled or canned beer and soft drinks has proven highly successful. As one time carriers for products packaged in rigid containers consisted of returnable wooden or heavy-gauge paperboard carriers provided with suitable partitions for separating each article to prevent damage or breaking. Returnable carriers have lost favor for many reasons which accumulated to produce high cost and inconvenience.

Present marketing efforts have been highly successful in increasing the appeal of multi-packs and effecting a substantial reduction in the cost of arranging the articles in a desired array. Further, multi-pack containers are in many instances relatively transparent so that the printed promotional matter and source identification is clearly visible to the buyer. Multi-packs of such a nature are made of thermoplastic web material which is tightly drawn over the articles crowding them to maintain their desired orientation.

Machinery for producing multi-pack overwraps of thermoplastic web essentially consist of horizontal form, fill and seal machines which include a roll of web material directed to a web former that makes the web material assume a tubular configuration, in part achieved by heat-sealing the longitudinal edges of the film. The groups of products are fed into the tube by a conventional lug conveyor insuring that each group of products is substantially equally longitudinally spaced. After the groups of products are within the film tube, cutting devices are provided for severing the film between the groups of products. Thereafter each group in its individual web tube or sleeve is directed to a heat tunnel where the sleeve is shrunk crowding the groups of products into a unitary package.

Known prior art devices for cutting the film between the groups of products are of two types. One type can be classified as a flying knife which essentially consists of a carriage mounted adjacent the conveyor. The carriage is reciprocated by suitable means moving the carriage parallel to the line of the web tube. The carriage, which includes a cutting device, whether it be a hot wire, a rotary knife or a knife achieving slicing action, is moved in the direction and at the same speed as the web and the knife carried thereby is brought into engagement with the web tube severing it between the groups of products. After cutting is completed the knife is brought to an inactive position and the carriage is then moved in the opposite direction, usually at a faster speed, so that it is prepared to make a cut between the next group of articles.

The other device for cutting the web tube between groups of articles can consist of a hot wire which is mounted adjacent the web tube and moved so that it has a velocity component equal to that of the web tube and a component transverse to the web tube. As the wire travels in its path the web tube between the article groups is severed.

The above briefly described web tube cutting devices, while fulfilling the need of reliably cutting the web tube, are expensive since the mechanisms required for the flying knife type cutter are rather complex dictating more frequent maintenance and high initial cost. In hot wire cut-off arrangements complexities arise in connecting the wire to the current. In some instances slip rings are used to alleviate the problem of braided wire conductors which are subject to failure due to their constant flexure. But slip rings do have the tendency to become contaminated, increasing electrical resistance, and are expensive to manufacture and install.

Apart from the above mentioned deficiencies, known web tube cutters suffer from the inability of being able to make a cut when the web tube between the groups of articles is comparatively short in length. Such a deficiency results in waste of web material and the production of an unsightly overwrap since the web material has a tendency to gather or bunch in the area of its severance even though substantial web shrinkage occurs after heating.

SUMMARY OF THE INVENTION

In accordance with the present invention a web tube cutter is provided movable in a plane transverse to the web tube but stationary relative to the path of the web tube. The cutter of the present invention is exemplified by a simplified construction as it is mounted on a frame which is stationary relative to the web tube. Since the cutter of the present invention does not exhibit any motion relative to the direction of web tube feed it must be actuated at extremely fast speeds so as not to interfere with the traveling web tube.

To achieve such high speed motion, the web cutter of the present invention provides a mechanism which greatly amplifies the speed of the cutter in that portion of the path when cutting of the web tube is effected. More particularly the cutter actuating mechanism comprises an oscillating bearing slidably retaining a connecting rod mounting a cutter at one end and the other end being journaled to a crank pin. Rotation of the crank pin in its circular orbit results in reciprocation of the connecting rod, and by virtue of the connecting rod being slidably mounted in an oscillating bearing, the knife, which is fixed to the other end of the connecting rod, experiences vertical and lateral displacement. As will be described in greater detail hereinafter the rate of change of velocity of the knife greatly increases as it moves toward the web tube reaching a maximum at the imaginary center of the web tube whereupon the change in velocity decreases, but not significantly, until cutting is completed.

In accordance with the present invention the knife is yieldably connected to the connecting rod so that in the event spacing between adjacent groups of articles were less than a predetermined minimum the knife would yield on contact with a group of articles. Such an arrangement obviously avoids the serious disorientation of the group of articles and prevents damage to the knife. However, in the event the resistance encountered by the knife in those instances where contact with a group of articles is made is, for a variety of reasons such as the nature of the articles, the apparatus of the present invention provides means for instantaneously disconnecting the motor of the wrapping machine from the electrical supply.

BRIEF DESCRIPTION OF THE DRAWINGS

FIG. 1 is a diagrammatic side elevation showing those components of a horizontal form, fill and seal machine associated with the novel cutting device of the present invention.

FIG. 1A is a fragmentary portion of FIG. 1,

FIG. 3 is a vertical section taken along lines 3—3 of FIG. 2 with portions broken away, FIG. 4 is a schematic of the drive showing the path followed by the tip of the cutting knife produced by the rotating crank pin and the oscillating bearing block, FIG. 5 is a fragmentary portion of the web tube showing a series of equally spaced articles therein and an imaginary line between adjacent articles along which the knife severs the web tube, FIGS. 6 and 7 illustrate the pivotal connection of the knife to its operating member and the attitude it will assume under certain conditions in the event the knife encounters too must resistance by the web tube or the articles enclosed therein.

DESCRIPTION OF THE PREFERRED EMBODIMENT

Figure 2:
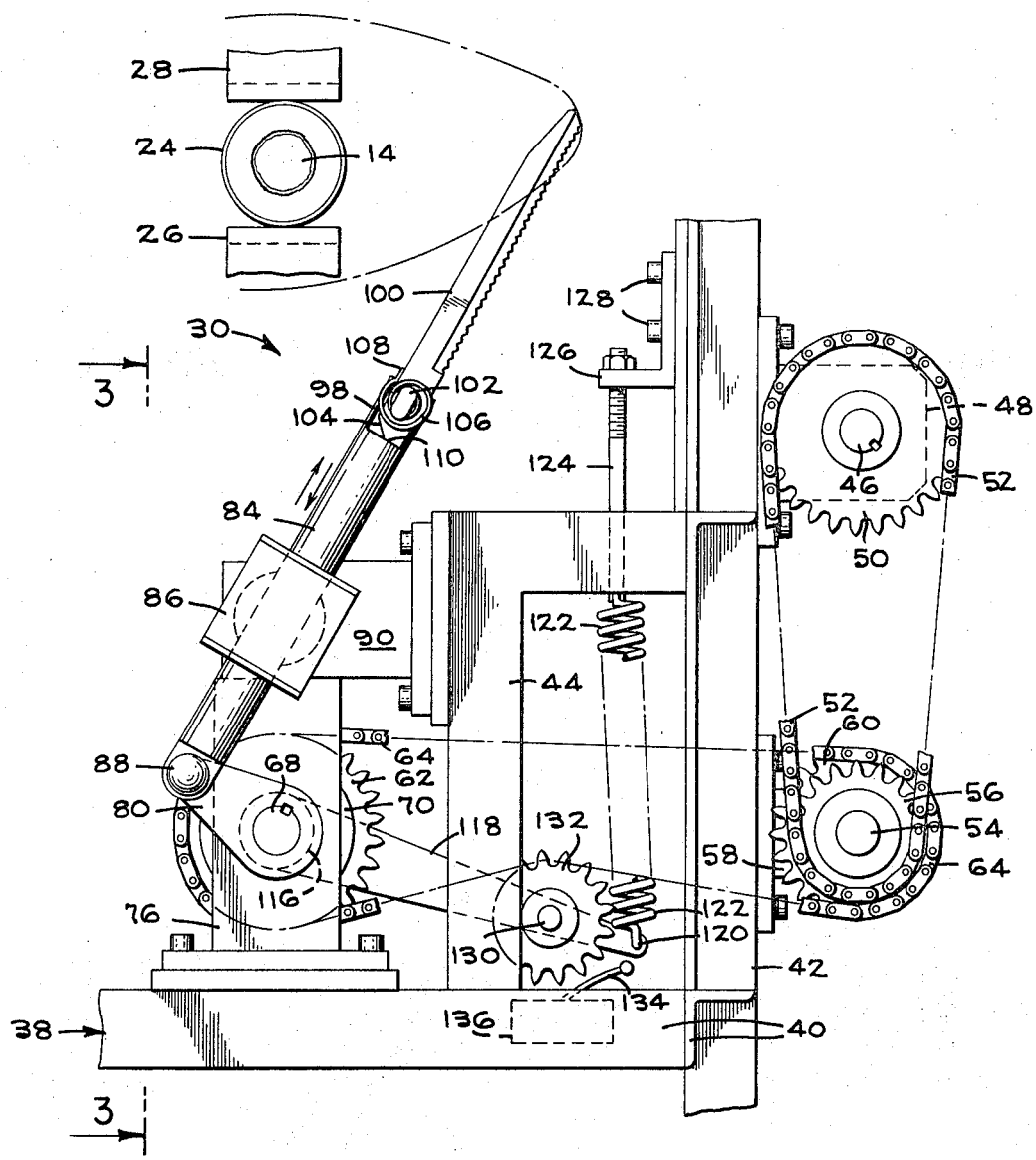
FIG. 2 is a fragmentary portion of that portion of the machine frame mounting the drive arrangement for the cut-off knife of the present invention.

The portion of the horizontal form, fill and seal machine shown in FIG. 1, and which is generally identified by the numeral 10, shows only those parts of the machine which are relevant to a complete understanding of the mechanism associated with the present invention. An infeed conveyor 12 transports a series of regularly longitudinally spaced singular groups of articles 14 to a web forming device 16 which receives web from a parent roll 18 supported on an unwind shaft 20 carried by conventional frame structures which are not shown. The former 16 applies the web around the individually spaced articles which may be considered to perform the function of a forming mandrel. The web edges are continually heat sealed by heated rotating rollers 22 (only one of which is shown) thus resulting in elongate tube 24 which encloses the regularly longitudinally spaced articles 14. As the web tube emerges from the former 16 with the articles encased therein they are received by conveyor 26 which is associated with an overlying vertically spaced conveyor 28 which gently presses the web tube against the articles and retains their desired longitudinal spacing. At the discharge end of the conveyor 26 the film cutting device 30 is located and, as previously mentioned, is actuated in a plane transverse to the web line. The cutting device 30 is timed so that the web tube 24 is cut along a line located intermediate and equidistant the adjacent articles 14.

Illustrating the theoretical line along which the web tube is cut references should be made to FIG. 5. The cut line is identified as CL and it will be observed that it is located intermediate and equidistant from the adjacent articles 14. To properly support the web tube and the adjacent articles against the whipping action of the knife as it is propelled transversely, receiving conveyors 32 and 34 which constitute, respectively, extensions of conveyors 26 and 28 are provided. As illustrated in FIG. 1A the leading article in the web tube is located between the conveyors 32 and 34 while the rearwardly adjacent article is located between the conveyors 26 and 28 thereby firmly holding the adjacent articles when the portion of the web tube located between is subjected to the action of the cutting device 30. After each article and the web tube portion associated therewith has been severed it is directed by conveyor 32 to a shrink tunnel 36 operating to heat the web and pull it tightly around the article.

To fulfill the objective of providing the shortest cut-off possible to thereby conserve web material and make a neat appearing package, the cutting device of the present invention is propelled in its cutting path by a mechanism that rapidly accelerates the cutting device. Since the web in a horizontal form, fill and seal machine is continually in motion it is absolutely essential that the cutting device either match the speed of the web while it is moved transversely to perform its cutting function or propelled through the web at speeds which would not interrupt the continuous motion of the web tube.

The mechanism for propelling the cutting device of the present invention is shown in FIGS. 2 and 3 wherein a fragmentary portion of the machine frame is identified by numeral 38. The frame 38 includes interconnected horizontal and vertical support rails 40 and 42, respectively mutually braced by right angle brackets 44. An input shaft 46 is rotatably supported in a bearing block 48 which is rigidly secured to the rail 42. A sprocket 50 is keyed on the shaft 46 and, through a sprocket chain 52, associated with the sprocket 50, rotation is imparted to a shaft 54 by virtue of a sprocket 56 fixed to the shaft 54. Shaft 54 is rotatably mounted in a bearing block 58 also fixed to the vertical support rail 42. In addition to the sprocket 56, the shaft 54 has keyed thereon a pair of sprockets 60 (only one of which is shown) for rotating a double sprocket wheel 62 (FIG. 3) by means of sprocket chains 64.

As shown in FIG. 3 sprocket wheel 62 is rotatably mounted by a bearing 66 on a shaft 68. Keyed to an enlarged portion 68a of the shaft 68 is an annular clutch plate 70 in engagement with a clutch plate 72 rigidly attached to the double sprocket wheel 62 by a series of fasteners 74. The shaft 68 is mounted for rotation in laterally spaced plates 76 by bearings 78. Keyed on one end of the shaft 68 is a crank lever 80 having a radially offset drive pin rotatably supporting, at 82, a connecting rod 84 slidably received in a roller bushing 86.

The crank 80 is provided with a handle 88 which can be grasped to move the shaft 68, to the right as viewed in FIG. 3, to disengage the clutch plate 70 and 72 to effect rotation of the plate 70 relative to the plate 72 and in order to synchronize the motion of the connecting rod 84 with respect to the spacing of the articles.

As shown in FIG. 2 brackets 44 have rigidly mounted thereon a pedestal 90 in which is rotatably mounted, by means of bearings 92, a rock shaft 94. On one end of the shaft 94 th roller bushing 86 is rigidly attached. The other end of the rock shaft 94 is held against axial displacement by collar 96. Considering FIGS. 2 and 3 it will be observed that the end of the connecting rod 84 projecting through the roller bushing 86 is formed with a tongue 98 defining a flat mounting surface for a knife 100 pivotally connected on the tongue by a fastener 102. The base of the knife is chamfered at 104 and the knife is held to define an extension of the connecting rod 84 by a coiled spring 106 having its inner coil held by the fastener 102 and its free end looped around the back edge of the knife at 108. The coiled spring urges the knife in a clockwise direction, as viewed in FIG. 2, firmly holding its base against the shoulder 110 of the connecting rod 84.

In accordance with one feature of the present invention the above described knife mounting arrangement allows the knife to pivot with respect to the connecting rod 84 in the event the knife should make contact with the web tube in a transverse plane in which one of the articles 14 may be located. There are many factors that would contribute to such a condition, but in all events the result would be irregular spacing of the articles 14 in the web tube 24.

It is also possible to purposely create articulation of the knife 100 with respect to the connecting rod 84 by either adjusting the tension of the spring 106 and/or providing a rate of angular acceleration which would cause pivotal movement of the knife 100 with respect to the connecting rod 84. In FIGS. 6 and 7 such a condition is illustrated. In FIG. 6 it will be observed that the knife 100 assumes an angular orientation relative to the connecting rod 84 before contact with the web tube 24 is made. In combination with the scalloped or serrated cutting edge 100a, which provides the best cutting action since points of extremely high stress are created, the angle of attack of the knife creates slicing action (FIG. 7) which results in shearing action and reduces the transverse force on the web tube thereby minimizing the tendency of the knife to disturb the orientation of the articles 14 in the web tube 24.

The unique drive arrangement described in connection with FIGS. 2 and 3 provides many benefits which will be explained in connection with the diagrammatic illustration of FIG. 4. The trace described by the crank pin 82 is identified by the circular construction line 112. The orbit described by an imaginary point on the end of the knife 100 is illustrated by the ellipse 114. As the crank 80 rotates in the orbit 112 the connecting rod 84 is reciprocated in the roller bushing 86 while the roller bushing is continually oscillated about the axis 94a of the rock shaft 94. As the crank pin 82 moves from the position shown in FIG. 4 to a point A of the trace of the orbit 112, the connecting rod 84 and knife 100 move upwardly and clockwise at an increasing angular acceleration so that the rate of change of the angle $a$ reaches a maximum when the tip of the knife arrives at the point A'. As the crank pin 82 moves from point A to point C, angular deceleration is imparted to the connecting rod 84 and the knife 100.

The motion imparted to the knife by the mechanism disclosed by the present invention can best be characterized as a whipping action which generates extremely fast movement. After the web tube has been severed the tip of the knife is drawn below the web tube and reaches its lowermost point when the crank pin 82 is coincident with point B of the line 112. The corresponding point on the ellipse 114 is identified as B'.

According to the above described operation of the film cutting device it can be appreciated that by the utilization of a conventional kinematic arrangement is simplified fast acting web cutting knife is provided which reduces to an absolute minimum the spacing of the articles 14 in the web tube 24 so as to minimize the amount of web needed to enclose articles in a web tube. Moreover, reducing the spacing between the articles 14 results in neater package as no bunching of the sleeve occurs after the individual articles have past through the shrink tunnel 36.

In accordance with another feature of the present invention a backup safety system is provided in the event the knife encounters cutting resistance above a determined maximum. Referring again to FIGS. 2 and 3 it will be seen that one end of the shaft 68 has rotatably mounted thereon a collar 116 to which is welded a lever 118, having connected at 120, a spring 122. The other end of the spring is attached to a stud 124 fastened to a bracket 126 which is rigidly attached to the support rail 42 by fasteners 128. On a short stub shaft 130 fixed to the lever 118, a pair of idler sprockets 132 (only on being shown) are rotatably mounted and are in running engagement with the sprocket chains 64. As shown most clearly in FIG. 2, the spring 122 urges the lever 118 so that the sprockets 132 tension the sprocket chains 64. Located for actuation by the lever 118 is a switch arm 134 operatively connected to a normally closed switch 136 which is in series with the main motor of the wrapping machine.

In the event of an unforseen obstruction encountered by the knife as it is projected in its plane of travel, the obstruction increases the tension of the sprocket chains 64 resulting in rotating the lever 118 in a clockwise direction, in opposition to the bias of the spring 122, thereby depressing the switch arm 134 which would consequently open the normally closed switch 136 disconnecting the motor from the line accordingly stopping the packaging machine.

Thus, in addition to the provision of allowing the knife to pivot with respect to the connecting rod 84 the apparatus of the present invention provides a backup system for interrupting operation of the packaging machine should unforeseen problems arise.

Although the best mode contemplated for carrying out the present invention has been herein shown and described, it will be apparent that modification and variation may be made without departing from what is regarded to be the subject matter of the invention.

I claim:

1. In a wrapping machine of the type comprising means for wrapping lingitudinally spaced articles in a tube of web material, means for advancing the tube of articles, means for severing the tube between articles, means for advancing the severed tube and articles therein and means for driving said severing means; the improvement wherein said severing means comprises an oscillating, crank driven knife, said driving means comprising a motor, driving and driven sprocket means for driving said crank, a tension member trained around said sprocket means, spring loaded idler means engaging the tension reach of said tension member, and control means operated by said idler means, said control means being responsive to the effect on said idler means of increased driving tension in said tension reach occasioned by the knife encountering arm obstruction, said idler means thereupon actuating said control means to de-energize said motor.

* * * * *

UNITED STATES PATENT OFFICE
CERTIFICATE OF CORRECTION

PATENT NO. : 3,800,498
DATED : April 2, 1974
INVENTOR(S) : Mitsugu Suzuki

It is certified that error appears in the above-identified patent and that said Letters Patent are hereby corrected as shown below:

Column 1, line 3, "As" should be --At--.

Column 4, line 52, "th" should be --the--.

Column 5, line 60, after "in" insert --a--.

Column 6, line 43, "lingitudinally" should be --longitudinally--.

Signed and Sealed this second Day of September 1975

[SEAL]

Attest:

RUTH C. MASON
Attesting Officer

C. MARSHALL DANN
Commissioner of Patents and Trademarks